(12) United States Patent
Oran

(10) Patent No.: US 7,380,010 B1
(45) Date of Patent: May 27, 2008

(54) METHOD AND APPARATUS FOR PERFORMING DENIAL OF SERVICE FOR CALL REQUESTS

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 10/640,173

(22) Filed: Aug. 12, 2003

(51) Int. Cl.
*G06F 15/16* (2006.01)

(52) U.S. Cl. .................................... 709/227

(58) Field of Classification Search ........ 709/227–229; 455/453
See application file for complete search history.

(56) References Cited

U.S. PATENT DOCUMENTS

2003/0152096 A1* 8/2003 Chapman ............... 370/412

OTHER PUBLICATIONS

Reynolds et al., STEM: Secure Telephony Enabled Middlebox, IEEE Communications Magazine, Oct. 2002.*

* cited by examiner

*Primary Examiner*—Andrew Caldwell
*Assistant Examiner*—Grant Ford
(74) *Attorney, Agent, or Firm*—Stolowitz, Ford, Cowger LLP (57) ABSTRACT

A Denial of Service (DoS) mitigation scheme increases the ability of a call processing server to fend off DoS attacks. The DoS mitigation scheme identifies a probability for dropping or denying a call request according to the current load on the call processing server. The probability is then weighted according to certain characteristics of the call request. For example, a call request from a previously authenticated source may be given a different weight than a request from an unauthenticated source. The weighted probability is then compared with a randomly generated number and the call request accepted or rejected according to the comparison.

31 Claims, 5 Drawing Sheets

METHOD AND APPARATUS FOR PERFORMING DENIAL OF SERVICE FOR CALL REQUESTS

BACKGROUND

A call processing server in an Internet Protocol (IP) network needs to survive Denial of Service (DoS) attacks while still completing and processing phone calls. A DoS attack refers to some sort of condition that causes the call processing server to inappropriately deny or drop a legitimate call request due to overload with unauthorized requests. For example, a DoS attack may consist of one or more unauthorized sources flooding the call processing server with call requests.

In one specific example, a Session Initiated Protocol (SIP) server mediates SIP sessions for setting up IP phone calls. The SIP session includes call signaling that may request the initiation or termination of a phone call, request something from the SIP server after the call is already established, or make a request to the SIP server unrelated to any call. The SIP server may deny the request if the source of the SIP signaling is unauthorized to make the call or if the source has requested too many call connections.

A substantial amount of resources may be consumed by the call processing server for authenticating and authorizing call requests. If the call processing server is flooded with these unauthorized call requests (DoS attack), the call processing server can become congested and not process other authorized call requests.

Schemes currently exist for addressing congestion in network processing devices. For example, Random Early Detection (RED) is a high-speed congestion avoidance mechanism that responds to network congestion by dropping packets at a selected rate. The RED scheme starts dropping packets before the network device becomes overloaded. This allows a sender of TCP/IP traffic to back-off from a current transmission rate averting a persistent congestion condition.

A Weighted Random Early Detection (WRED) scheme provides a more intelligent classification of the TCP/IP traffic than RED. For example, certain sources of traffic can be assigned a higher priority that other sources of network traffic. This allows packets to be dropped from particular sources that may flood the network processing device.

RED and WRED have in prior art been applied at the packet level in intermediate switching and routing devices. Neither are directly applicable to handling requests in servers, nor to the function of mitigating denial of service attacks.

SUMMARY OF THE INVENTION

A Denial of Service (DoS) mitigation scheme increases the ability of a call processing server to fend off DoS attacks. The DoS mitigation scheme calculates a probability for dropping or denying a call request according to the current load on the call processing server. The probability is then weighted according to certain characteristics of the call request. For example, a call request from a previously authenticated source may be given a different weight than a request from an unauthenticated source. The weighted probability is then compared with a randomly or pseudo-randomly generated number and the call request accepted or rejected according to the comparison.

DETAILED DESCRIPTION

Figure 1:
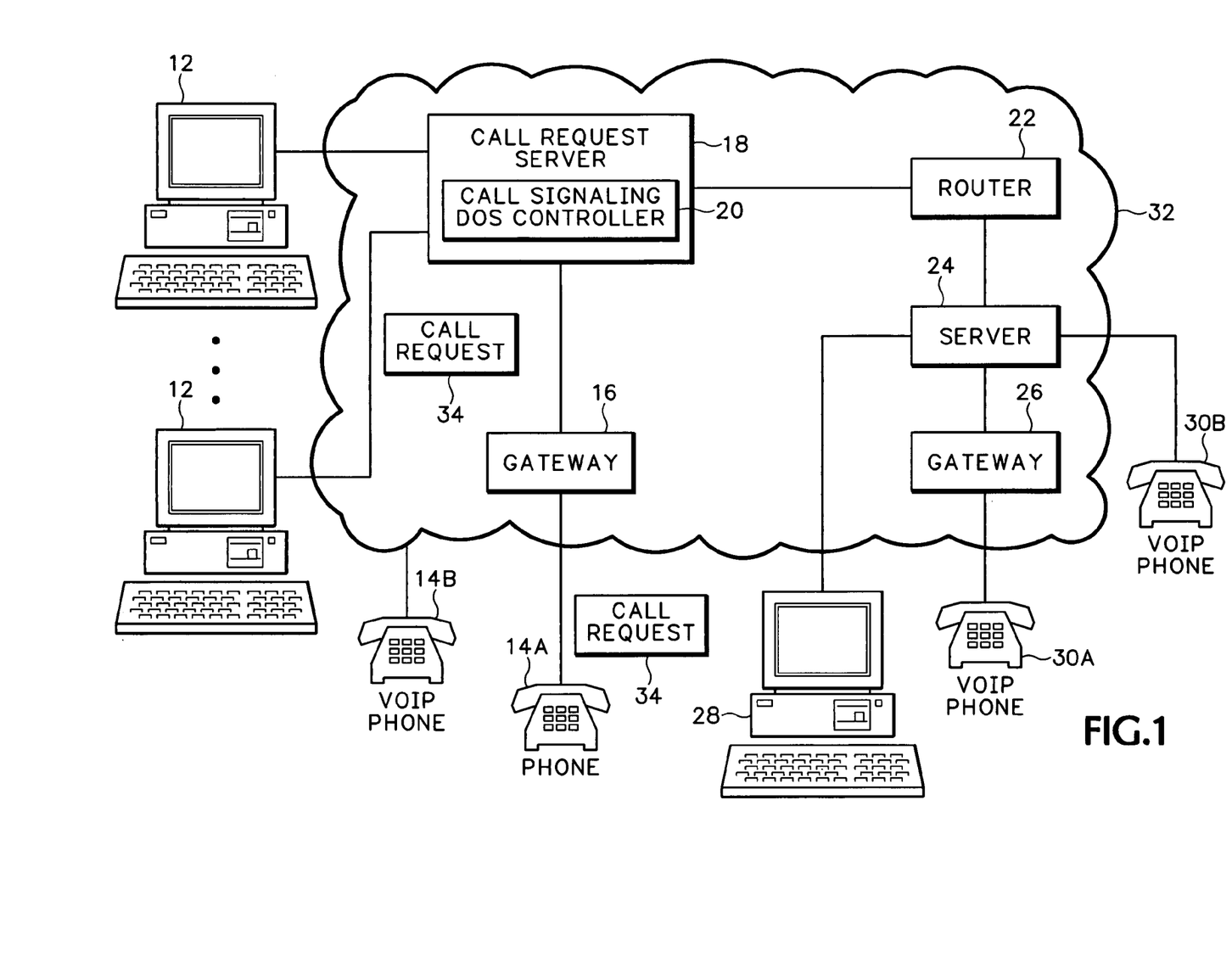
FIG. 1 is a block diagram of a wide area network that uses a DoS mitigation scheme for call signaling.

FIG. 1 shows a wide area network that includes in part a packet switched Internet Protocol (IP) network 32. The IP network 32 includes a call processing server 18 that receives call request signaling 34 from various sources such as computers 12, a conventional phone 14A or a VoIP phone 14B. The phone 14B may be a Voice Over IP (VoIP) phone or a computer that connects directly to the IP network 32. The conventional phone 14B connects to the call processing server 18 via a gateway 16.

The call requests 34 can include the signaling used for initially establishing an IP phone call between one of the sources 12, 14A or 14B and an endpoint such as another VoIP phone 30B, computer 28, or a conventional phone 30A. If the call processing server 18 accepts the call request 34, a connection is established between the source 12, 14A or 14B and the endpoint 18, 30A or 30B over IP network 32. The call connection may be established over any variety of different network processing devices, such as a router 22, server 24 and gateways 16 and 26.

As part of establishing the phone call, the source 12, 14A or 14B conducts a call signaling exchange with the call processing server 18. In one example, the call processing server 18 is a SIP server and the call request 34 comprises SIP signaling used by the call processing server 18 for authenticating and authorizing the call request 34. The call request 34 can be a request to initiate a new call, a request to terminate a call, a request in the middle of an existing call, or another request that may not necessarily be related to a call. If the call request 34 is authenticated and authorized, the call processing server 18 completes the request, for example, by establishing an IP call connection between the call request source and an identified endpoint.

Authentication may require the call processing server 18 to decrypt an encrypted password, or verify a public key signature sent by the source 12 or 14 in the call request 34. Authorization may include the call processing server 18 verifying the source has authorization to make a call to a particular call destination. Call request signaling, such as the types of signaling used in SIP, are known to those skilled in the art and is therefore not described in further detail.

A call signaling Denial of Service (DoS) controller 20 in server 18 decides whether to accept, ignore, or reject a call request 34 prior to the call processing server 18 conducting initial processing of the call signaling, such as authentication or authorization. The call processing server 18 is more resilient to DoS attacks because the controller 20 rejects or discards certain call requests before the server 18 uses processing resources to determine what the call request is requesting.

Figure 2:
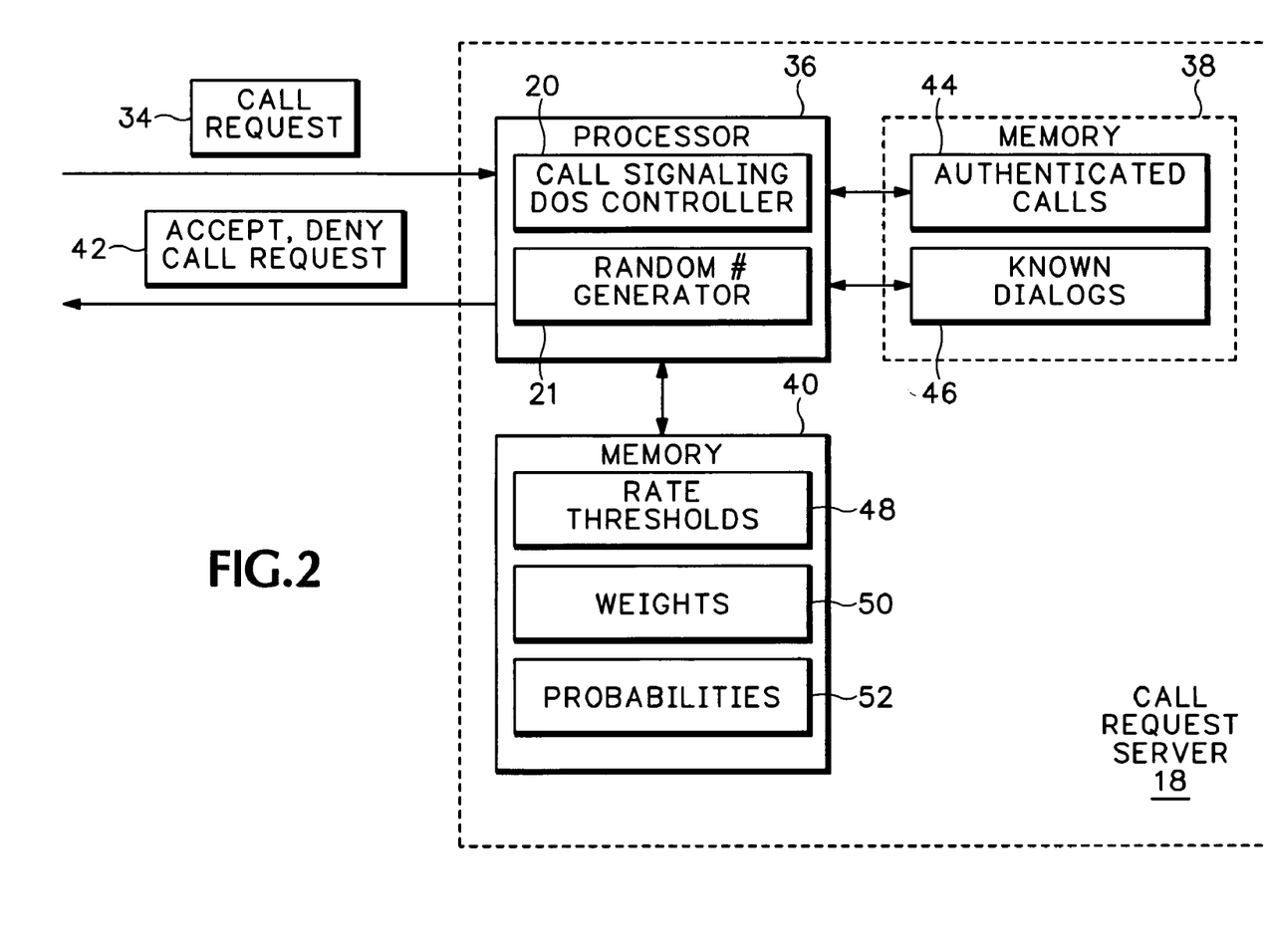
FIG. 2 is a more detailed block diagram of a call processing server shown in FIG. 1.

FIG. 2 shows the call processing server 18 in more detail. The server 18 includes a processor 36 and memories 38 and 40. The memories 38 and 40 may be internal memory in the processor 36 or memory external to the processor 36. Memory 38 contains information identifying authenticated calls 44 and known dialogs 46 for calls previously accepted by the server 18.

Examples of information identifying authenticated calls 44 may include the identification of a source previously authorized through a Transport Layer Security (TLS) protocol. Examples of information identifying known dialogs 46 include numeric or string values identifying a currently established call session.

Figure 3:
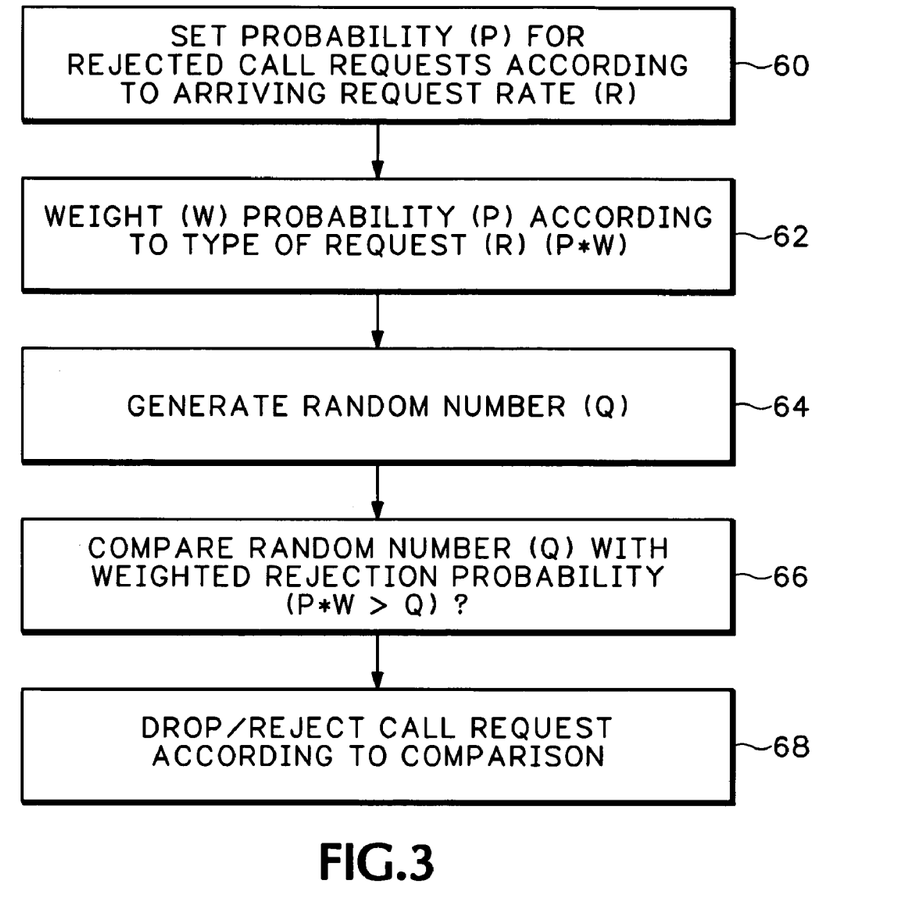
FIG. 3 is a flow diagram showing how a call signaling DoS controller in the call processing server operates.

Rate thresholds 48 are preconfigured values used for comparing with a current call request rate for the call processing server 18 (see FIG. 3). Probability values 52 are values associated with a probability of denying a call request. The weight values 50 are associated with a weighting applied to the probability values 50 according to a particular category for the call request 34.

The controller 20 in processor 36 compares characteristics of the call request 34 with the values in memories 38 and 40. According to those comparisons, the controller 20 generates a weighted probability of denying the call request 34. The processor 36 then compares the weighted probability with a random number generated by random number generator 21. Based on this comparison, the controller 20 either accepts or rejects the call request 34 prior to any substantial processing by the server 18. The controller 20 may be implemented in software that is executed by processor 36. Alternatively, the controller 20 may be a state machine or other special circuitry running independently of processor 36.

Referring to FIG. 3, call processing server 18 maintains a request rate R, which in one example is the total exponentially averaged arriving call request rate. In another example, the request rate R is a value generated by the SIP protocol associated with the number of SIP transaction requests currently being processed by the call processing server 18. Other request parameters may also be used that differentiate call requests for established calls from call requests for new calls. Other values can also be used instead of request rate R that give some indication of loading on the call processing server 18.

In block 60, the controller 20 (FIG. 2) sets a probability P for rejecting call requests according to the request rate R. This is further described in FIG. 4. In block 62, the probability P is weighted with a value W that varies according to identified characteristics of call request 34. For example, if the call request corresponds with a currently authenticated call, a smaller weight value may be applied to the probability P. The smaller weight value means there is less probability that the call request 34 will be dropped or denied.

In block 64, the controller 20 generates a random or pseudo-random number Q. The random number Q is compared with the weighted probability (P*W). In one example, if the weighted probability is greater than the random number (P*Q>Q), the call request 34 is dropped or denied in block 68. If the weighted probability (P*W) is not greater than the random number Q, the call request is accepted in block 68. If the call request is accepted, call processing server 18 continues processing the call request. For example, call processing server may authenticate the source of the call request and then determine what the source is requesting.

Figure 4:
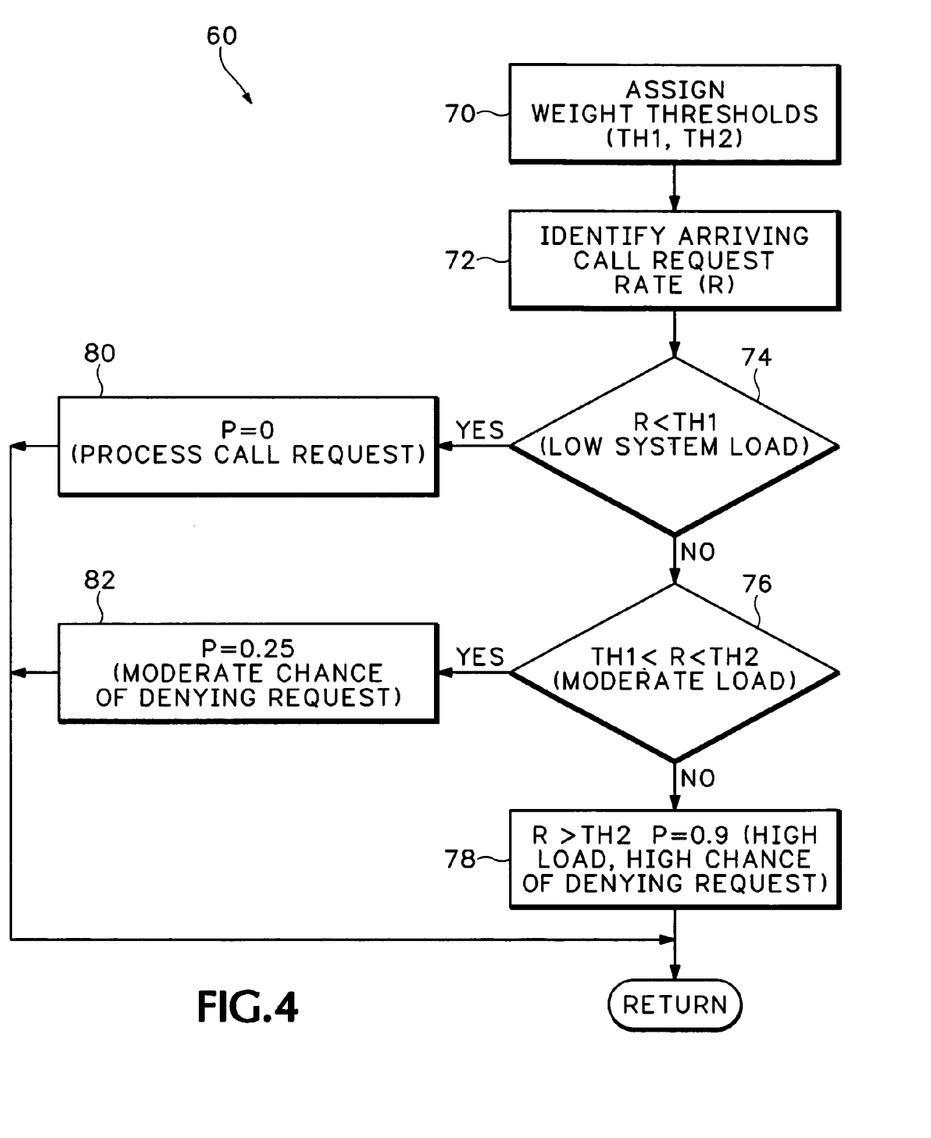
FIG. 4 is a flow diagram showing how a probability is determined for accepting or rejecting a call request.

FIG. 4 shows one example of how the probabilities for dropping or denying a call request 34 are determined for block 60 in FIG. 3. This of course is only one example and any other types of probability generation schemes and associated probability values can be used. The specific type of scheme used for generating the probability value may depend on the processing characteristics of the call processing server 18 and the desired level of denial of service protection. For example, if the system operator wishes to increase overload protection, the probability values can be increased.

In block 70 the rate thresholds 48 (FIG. 2) are assigned or configured into the call processing server. In one example, the rate thresholds are originally derived from empirical data. In this example there are two rate thresholds TH1 and TH2. The first threshold TH1 represents a threshold between a low call request rate (low load) and a moderate call request rate (moderate load). The second threshold TH2 represents a threshold between the moderate call request rate and a high call request rate (high load).

The number of thresholds and the values used for the thresholds can also vary depending on how many different probability values are assigned to call requests. For example, DoS can be tailored to the call processing server 18 by using more thresholds or varying the threshold values.

The request rate R for the call processing server 18 is identified in block 72, for example, by running SIP. The request rate R is compared with the first rate threshold TH1 in block 74. When the request rate R is less than the first TH1 threshold, the probability P is set to zero in block 80. This represents little or no call request load on the server 18. By setting the probability P=0, the call processing server has no probability of dropping or denying the call request. In other words, the call processing server will conduct the initial signaling process for the call request.

If the request rate R is between TH1 and TH2 in block 76, the call processing server is moderately loaded. In this condition, a higher probability value is selected, for example, P=0.25. A higher probability value means there is a higher probability that the call processing server will drop or deny a new call request prior to performing initial call request processing. The call processing server 18 is heavily loaded when the request rate R is larger than TH2. In this state, a highest probability value is assigned, for example P=0.9. In this high load state, there is a high probability that the call processing server will deny or drop call requests before conducting any conventional call request processing. The probability values described above are only examples. The actual values used can vary according to the processing characteristics of the call processing server 18.

Figure 5:
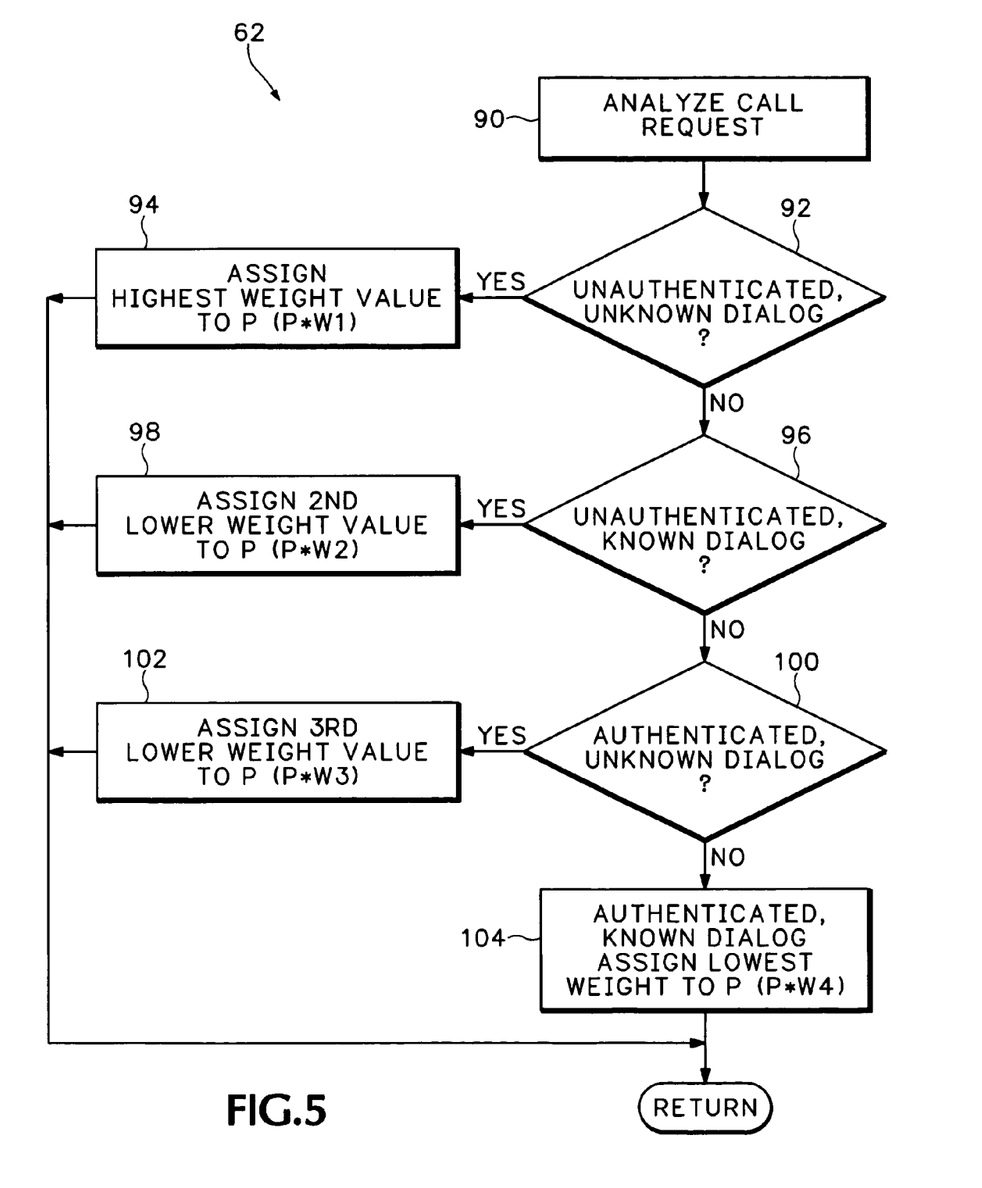
FIG. 5 is a flow diagram showing how a weight is assigned to the probability.

FIG. 5 shows one example of how the weights in block 62 of FIG. 3 are assigned to the probability generated in FIG. 4. The weight values W1, W2, W3 and W4 are also calculated from empirical data corresponding with the operating characteristics of the call processing server 18. The number of weights and the values for each weight can also be changed depending on the level of desired overload protection and the specific type of DoS protection desired for different network conditions.

In block 90 the controller 20 in the call processing server 18 (FIG. 2) analyzes a received call request signaling 34. In this example, the controller 20 checks to see if the incoming call request is authenticated and for a known dialog. An unauthenticated call refers to a call request where the server 18 has not yet authenticated the identity of the source sending the call request. An unknown dialog refers to a call request that is not associated with an existing call.

The controller 20 determines the authentication and dialog status of the call request by comparing the source and dialog information in the call request with the information in memory 38 (FIG. 2). For example, SIP may be operated over a Transport Layer Security (TLS) protocol. Establishing a TLS session requires a relatively large amount of processing by the call processing server. If a SIP call request is received over a previously established TLS connection, the SIP call request signaling can be considered authenticated.

Alternatively, the SIP call request may be received by the call processing server over a non-TLS connection. In another case, the call request is received over a TLS connection but the source of the call request is different from the source that originally established the TLS connection. In these situations, the call request is considered unauthenticated.

The controller 20 determines if a call is associated with a known dialog by looking at a field in the call request signaling 34 and then matching the value in that field with known dialogs 46 in memory 38 (FIG. 2).

In block 92, the controller 20 (FIG. 2) determines that the source for the incoming call request is an unauthenticated source and has an unknown dialog. In this case, a largest amount of server processing resources would be required to initially authenticate and setup the call request. There is also more risk that the call request may have come from an unauthorized source. Thus a highest weight value W1 is applied to the probability previously identified in FIG. 4 (P*W1). This means that the call request has a highest probability of being dropped or denied by controller 20.

A lower weight is applied to the probability in block 98 (P*W2) when the source of the call request is unauthenticated but the request is for a known dialog in block 96. A third even lower weight (less chance of rejecting request) is applied to the probability in block 102 (P*W3) when the call request comes from an authenticated source but has an unknown dialog in block 100. If the call request is from an authenticated source and has a known dialog, a lowest weight W4 is applied to the probability in block 104 (P*W4).

Referring back to FIG. 3, after a weight is applied to the probability in block 62, the random number Q is generated in block 64. In this example, the random number is between 0 and 1. If the weighted probability in block 62 is greater than the random number generated in block 66 (P*W>Q), the call request is dropped or denied in block 68. For example, the controller 20 in FIG. 2 directs a SIP process in server 18 to drop or deny the call request. A rejection message 42 may be sent back to the source of the call request 34. If the weighted probability is equal or less than the random number Q, the call request is processed. For example, the TLS and SIP sessions are processed by the call processing server 18.

The system above takes into account the ability of the call processing server to deal with peak loads. The call request rate R is used in the example above, however some other equivalent time period can be used that is long enough so that legitimate call request avalanches are not misdetected as DoS, and short enough to prevent the call processing server from getting so overloaded that it becomes unstable.

The sources or types of call requests (principals) are then classified, since a legitimate request pattern from one class of call request might not be legitimate from a different class. These principals can be classified as finely as desired. In the example above, the principals are classified according to whether or not the call request was authenticated and belong to a known dialog. The classification could also be based on whether or not the principals are in the same domain or in a different domain. In another example, the classification can be based on whether or not the principals match the identity of the transport connection the call request came over.

Another consideration, as described above in FIG. 5, takes into account the amount of work needed by the call processing server to determine exactly what the principal is requesting. If the amount of work needed to make this determination is so large that the call processing server cannot survive a DoS attack, then the principal's requests are more likely to be denied or dropped. For example, it is computationally expensive for the call processing server to authenticate the source of the call request in a TLS session. However it is substantially less computationally expensive to determine if a call request is associated with a known call dialog. Thus, as described above in FIG. 5, an unauthenticated call request is weighted differently than a call request from an unknown dialog.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A network processing device, comprising:
a processor configured to conduct a denial of service mitigation for Internet Protocol (IP) call request signaling, wherein the processor identifies a probability for accepting or rejecting the call request signaling according to an amount of loading on the network processing device and wherein the processor weights the probability according to how much processing is required to determine what the call request signaling is requesting.

2. The network processing device according to claim 1 wherein the processor makes a determination whether to accept, reject, or drop the call request signaling prior to determining what the call request signaling is requesting.

3. The network processing device according to claim 1 wherein the processor generates the probability according to a rate that call requests are being received by the network processing device.

4. The network processing device according to claim 1 wherein the processor weights the probability according to whether or not a source of the call request signaling has previously been authenticated, wherein the probability provides an indefinite likelihood indication for accepting or rejecting the call request signaling.

5. The network processing device according to claim 1 wherein the processor weights to the probability according to whether or not the call request signaling is associated with a known dialog for a call that has already been established.

6. The network processing device according to claim 1 wherein the processor compares the weighted probability to a random number and accepts or denies the call request signaling according to the comparison.

7. The network processing device according to claim 1 wherein the call request signaling comprises SIP signaling requests, and the processor makes a decision to accept or reject the SIP signaling requests prior to determining what is being requested in the SIP signaling requests.

8. A method configured to conduct denial of service mitigation for Internet Protocol (IP) call request signaling, comprising:
  determining a probability for denying or accepting a call request according to loading on a device receiving the call request signaling;
  weighting the probability according to one or more characteristics associated with the call request signaling; and
  accepting or denying the call request signaling according to the weighted probability.

9. The method according to claim 8 including:
  determining a call request rate for the device;
  comparing the call request rate to rate thresholds; and
  determining the probability according to the comparison.

10. The method according to claim 8 including weighting the probability according to an amount of processing required by the device to determine what the call request signaling is requesting.

11. The method according to claim 8 including weighting the probability according to whether or not the call request signaling requires authentication.

12. The method according to claim 8 including weighting the probability according to whether or not the call request signaling is associated with an already established call.

13. The method according to claim 8 including:
  generating a random number;
  comparing the weighted probability to the random number; and
  accepting or denying the call request signaling according to the comparison between the random number and the weighted probability.

14. The method according to claim 8 including:
  assigning a first high probability of rejecting the call request signaling when the load on the device is within a first high load range;
  assigning a second lower probability of rejecting the call request signaling when the load on the device is within a second lower load range; and
  assigning a third lower probability of rejecting the call request signaling when the load on the device is within a third lower load range.

15. The method according to claim 8 including receiving Session Initiated Protocol (SIP) call request signaling and accepting or denying the SIP call request signaling according to the weighted probability.

16. A system configured to conduct denial of service mitigation for Internet Protocol (IP) call request signaling, comprising:
  one or more processors having:
  means for determining a probability for denying or accepting a call request according to loading on a device receiving the call request signaling;
  means for weighting the probability according to one or more characteristics associated with the call request signaling; and
  means for accepting or denying the call request signaling according to the weighted probability.

17. A system according to claim 16 including:
  means for determining a call request rate for the device;
  means for comparing the call request rate to rate thresholds; and
  means for determining the probability according to the comparison.

18. A system according to claim 16 including means for weighting the probability according to an amount of processing required by the device to determine what the call request signaling is requesting.

19. A system according to claim 16 including means for weighting the probability according to whether or not the call request signaling requires authentication.

20. A system according to claim 16 including means for weighting the probability according to whether or not the call request signaling is associated with an already established call.

21. A system according to claim 16 including:
  means for generating a random number;
  means for comparing the weighted probability to the random number; and
  means for accepting or denying the call request signaling according to the comparison between the random number and the weighted probability.

22. A system according to claim 16 including:
  means for assigning a first high probability of rejecting the call request signaling when the load on the device is within a first high load range;
  means for assigning a second lower probability of rejecting the call request signaling when the load on the device is within a second lower load range; and
  means for assigning a third lower probability of rejecting the call request signaling when the load on the device is within a third lower load range.

23. A system according to claim 16 including means for receiving Session Initiated Protocol (SIP) call request signaling and accepting or denying the SIP call request signaling according to the weighted probability.

24. A computer-readable storage medium having stored thereon instructions for conducting denial of service mitigation of Internet Protocol (IP) call request signaling which when executed, result in of a method comprising:
  determining a probability for denying or accepting a call request according to loading on a device receiving the call request signaling;
  weighting the probability according to one or more characteristics associated with the call request signaling; and
  accepting or denying the call request signaling according to the weighted probability.

25. The computer readable medium according to claim 24, wherein the instructions, when executed, further comprise:
  determining a call request rate for the device;
  comparing the call request rate to rate thresholds; and
  determining the probability according to the comparison.

26. The computer readable medium according to claim 24, wherein the instructions, when executed, further comprise weighting the probability according to an amount of processing required by the device to determine what the call request signaling is requesting.

27. The computer readable medium according to claim 24, wherein the instructions, when executed, further comprise weighting the probability according to whether or not the call request signaling requires authentication.

28. The computer readable medium according to claim 24, wherein the instructions, when executed, further comprise weighting the probability according to whether or not the call request signaling is associated with an already established call.

29. The computer readable medium according to claim 24, wherein the instructions, when executed, further comprise:
generating a random number;
comparing the weighted probability to the random number; and
accepting or denying the call request signaling according to the comparison between the random number and the weighted probability.

30. The computer readable medium according to claim 24, wherein the instructions, when executed, further comprise:

assigning a first high probability of rejecting the call request signaling when the load on the device is within a first high load range;
assigning a second lower probability of rejecting the call request signaling when the load on the device is within a second lower load range; and
assigning a third lower probability of rejecting the call request signaling when the load on the device is within a third lower load range.

31. The computer readable medium according to claim 24, wherein the instructions, when executed, further comprise receiving Session Initiated Protocol (SIP) call request signaling and accepting or denying the SIP call request signaling according to the weighted probability.

* * * * *